(12) United States Patent
Rutherford et al.

(10) Patent No.: US 12,196,930 B2
(45) Date of Patent: Jan. 14, 2025

(54) HIGH IMAGE QUALITY DURING OFF-AXIS PROJECTION USING A FREE-FORM MIRROR

(71) Applicant: Adway International, Inc., Los Angeles, CA (US)

(72) Inventors: Todd Scott Rutherford, Wyoming, OH (US); William Earl Phillips, III, Cincinnati, OH (US); Brandon Antonio Sosa, Cincinnati, OH (US)

(73) Assignee: Adway International, Inc., Los Angeles, CA (US)

( * ) Notice: Subject to any disclaimer, the term of this patent is extended or adjusted under 35 U.S.C. 154(b) by 446 days.

(21) Appl. No.: 17/761,488

(22) PCT Filed: Sep. 18, 2020

(86) PCT No.: PCT/US2020/051675
§ 371 (c)(1),
(2) Date: Mar. 17, 2022

(87) PCT Pub. No.: WO2021/055884
PCT Pub. Date: Mar. 25, 2021

(65) Prior Publication Data
US 2022/0365325 A1 Nov. 17, 2022

Related U.S. Application Data

(60) Provisional application No. 62/903,687, filed on Sep. 20, 2019.

(51) Int. Cl.
*G02B 13/16* (2006.01)
*G02B 3/00* (2006.01)
(Continued)

(52) U.S. Cl.
CPC .............. *G02B 13/16* (2013.01); *G02B 13/18* (2013.01); *G03B 21/28* (2013.01); *G02B 3/005* (2013.01); *G03B 21/208* (2013.01)

(58) Field of Classification Search
CPC ........ G02B 13/16; G02B 13/18; G02B 3/005; G02B 17/06; G02B 27/18; G03B 21/28; G03B 21/208
See application file for complete search history.

(56) References Cited

U.S. PATENT DOCUMENTS

2002/0089757 A1 7/2002 Bignolles et al.
2005/0147135 A1 7/2005 Kurtz et al.
(Continued)

OTHER PUBLICATIONS

PCT International Search Report and Written Opinion, International Application No. PCT/US2020/051675, dated Dec. 16, 2020, 10 Pages.
(Continued)

*Primary Examiner* — Magda Cruz
(74) *Attorney, Agent, or Firm* — Fenwick & West LLP

(57) ABSTRACT

An extreme off-axis image projection system substantially compensates for image-quality-degrading aberrations typical to off-axis imaging systems. This is accomplished through the use of a free-form mirror in conjunction with both spherical and aspherical refractive elements and an off-axis placement of the input image source. In some embodiments, the off-axis image projection system contains a free-form mirror and a projection lens system with multiple lenses. The projection system projects light from an image source onto a surface (aka, projection surface). The projection surface is both close to the projector (in z) and extends away from the projector (in x and y).

18 Claims, 7 Drawing Sheets
(4 of 7 Drawing Sheet(s) Filed in Color)

(51) Int. Cl.
*G02B 13/18* (2006.01)
*G03B 21/20* (2006.01)
*G03B 21/28* (2006.01)

(56) References Cited

U.S. PATENT DOCUMENTS

| | | | |
|---|---|---|---|
| 2006/0227432 A1 | 10/2006 | Yoshikawa et al. | |
| 2006/0262284 A1* | 11/2006 | Onishi | G03B 21/145 |
| | | | 348/E5.143 |
| 2007/0285780 A1 | 12/2007 | Mafuku et al. | |
| 2009/0141250 A1* | 6/2009 | Destain | G03B 21/10 |
| | | | 353/69 |
| 2010/0238416 A1* | 9/2010 | Kuwata | G03B 21/28 |
| | | | 359/728 |
| 2011/0002051 A1* | 1/2011 | Hsu | G02B 13/16 |
| | | | 359/717 |
| 2014/0022518 A1* | 1/2014 | Amano | G03B 21/28 |
| | | | 359/364 |

OTHER PUBLICATIONS

European Patent Office, Extended European Search Report, European Patent Application No. 20866112.4, Oct. 2, 2023, 10 pages.

\* cited by examiner

HIGH IMAGE QUALITY DURING OFF-AXIS PROJECTION USING A FREE-FORM MIRROR

CROSS-REFERENCE TO RELATED APPLICATION(S)

This application claims priority to U.S. Provisional Patent Application Ser. No. 62/903,687, "High Image Quality During Off-Axis Projection Using A Free-Form Mirror," filed Sep. 20, 2019. The subject matter of all of the foregoing is incorporated herein by reference in its entirety.

BACKGROUND

1. Technical Field

This disclosure relates generally to off-axis image projection systems.

2. Description of Related Art

Off-axis image projection systems suffer from non-uniform relative illumination (RI), non-uniform modulus of the optical transfer function (MTF), non-uniform magnification (distortion) and non-uniform shape (keystoning), to name a few issues. These non-uniformities are exasperated when the off-axis projection angles increase and/or when the distance from the projector's final optical surface is forced to come close to the output projection plane.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

In some embodiments, an extreme off-axis image projection system substantially compensates for image-quality-degrading aberrations typical to off-axis imaging systems. This is accomplished through the use of a free-form mirror (or other type of non-spherical mirror) in conjunction with both spherical and aspherical refractive elements and an off-axis placement of the input image source.

Figure 1:
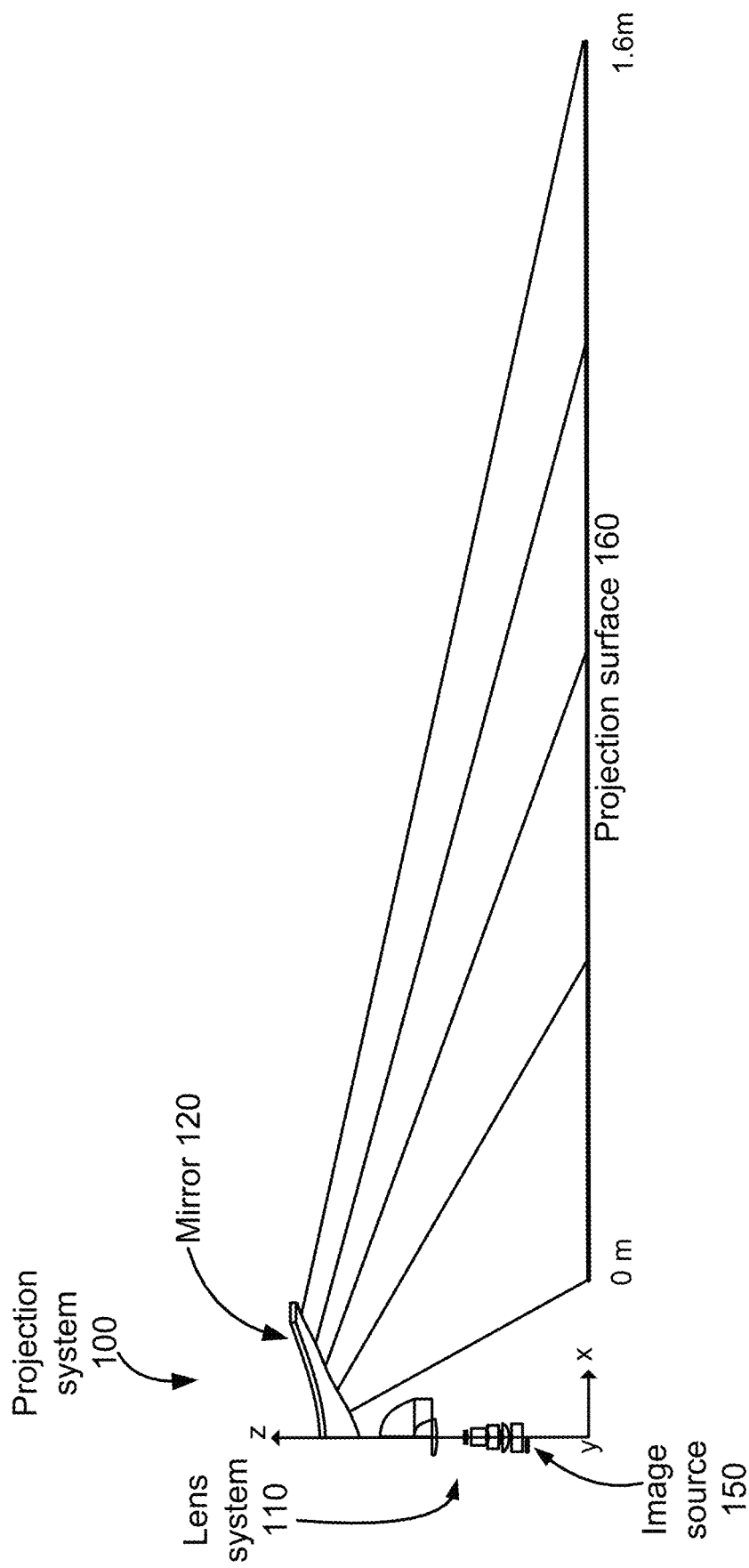
FIG. 1 is a cross-sectional view of an example embodiment of an off-axis image projection system.
Figure 5A:
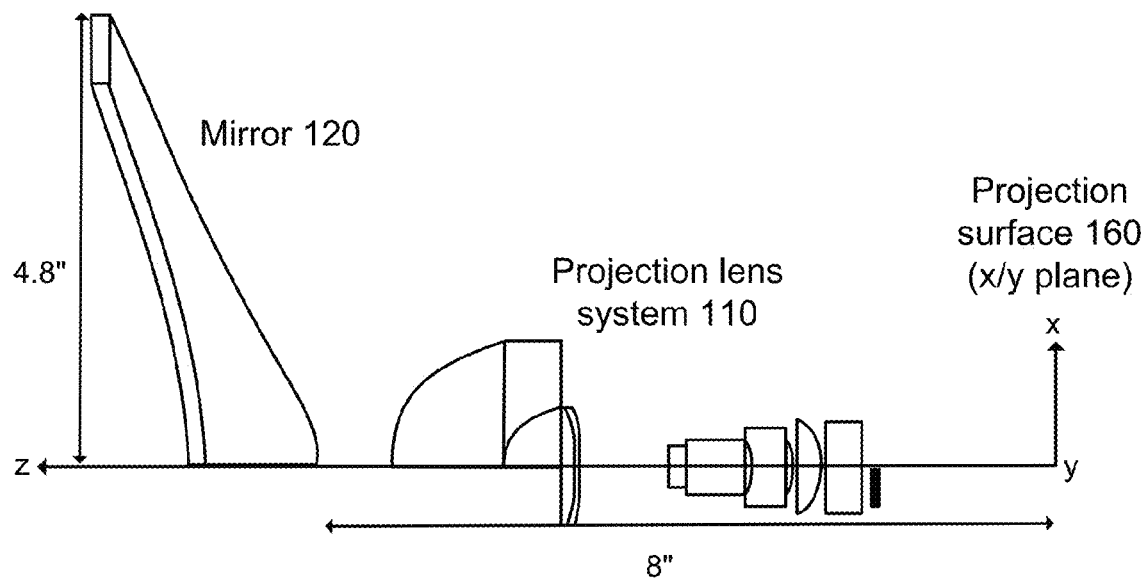
FIGS. 5A and 5B are a diagram and ray trace for the imaging path through the off-axis image projection system of FIG. 1.

FIG. 1 is a cross-sectional view of an example embodiment of such an off-axis image projection system. The off-axis image projection system 100 contains a projection lens system 110 with multiple lenses and also contains a free-form mirror 120. FIG. 5A (discussed in more detail below) is a magnified view of the lens system 110. In this example, the lens system 110 contains spherical and aspherical lenses. The projection system 110 projects light from an image source 150 onto a surface 160 (aka, projection surface). The projection surface 160 is both close to the projector (in z) and extends away from the projector (in x and y).

The coordinate system is defined as follows. The optical axis of the lens system 110 defines the z-axis. The projection surface 160 may be non-planar (e.g., a car door), but it extends primarily perpendicularly to the z-axis. The long direction of the projection surface 160 defines the x-axis and the other direction defines the y-axis. For example, if the projection surface is approximately rectangular, then the long edge of the rectangle defines the x-axis and the short edge defines the y-axis.

The image source 150 is offset in one direction along the x-axis (along the −x direction in FIG. 1), and the mirror 120 and the projection surface 160 are offset in an opposite direction along the x-axis (+x direction in FIG. 1). In some designs, all of the image-forming rays from the image source 150 originate from one side of the y-z plane (i.e., from the −x side). They cross the y-z plane and then reflect off the mirror 120 to the projection surface 160, so that the footprint of the image-forming rays on the mirror 120 is entirely on the +x side of the y-z plane, as is the image on the projection surface 160. The image source 150 and projection surface 160 may also be offset in opposite directions with respect to the y-axis.

In these designs, the overall system (image source 150, projection system 100 projection surface 160) is compact along the z dimension, but the projection surface 160 may extend significantly in the x- and y-directions. In some embodiments, the length of the system along the z-axis is not more than 220 mm, or even 200 mm or less; while the projection surface is at least 1000 mm×600 mm (x-dimension×y-dimension) or even 1200 mm×680 mm or larger. In some embodiments, the x-extent of the projection surface is in the range 850 mm to 1600 mm, or even larger. The y-extent of the projection surface may be in the range 500 mm to 800 mm or even larger. The ratio of the x-extent to the z-extent is preferably at least 6:1, and may be in the range of 4:1 to 10:1.

Image quality issues, such as low relative illumination (RI), low modulus of the optical transfer function (MTF), high distortion, high keystoning, and other image quality degradations, are substantially mitigated by using a free-form mirror 120 in conjunction with off-axis refractive optics 110, as described in more detail below.

Figure 2:
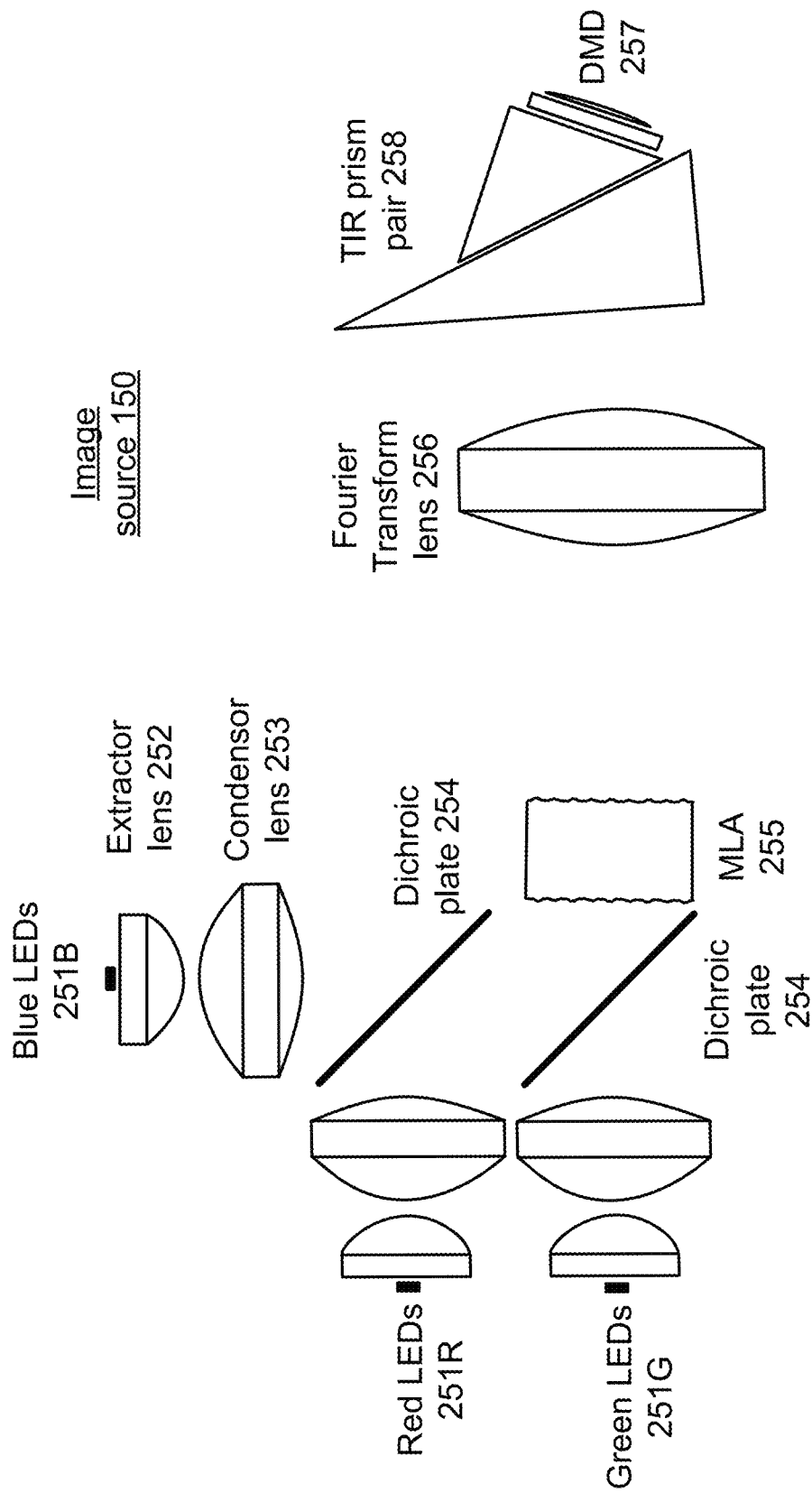
FIG. 2 is a diagram of the image source for the projection system of FIG. 1.

FIG. 2 is a diagram of the image source 150 for the projection system of FIG. 1, including light source collimators, spectral beam combiners, and beam homogenizer. In this example, the light sources are arrays of red, green and blue light emitting diodes (LEDs) 251R,G,B. Extractor lenses 252, condenser lenses 253 and dichroic plates 254 are used to condition and combine the light from the different LED arrays 251. A Micro-Lens Array (MLA) 255 is used in conjunction with a Fourier Transforming lens 256 to convert the Gaussian-like beam intensity profiles from the collimated light sources to a substantially-flat irradiance profile at the spatial light modulator 257, which in this example is a deformable micromirror device (DMD). A Total Internal Reflection (TIR) prism pair 258 is used to couple the light into and out of the DMD.

Figure 3:
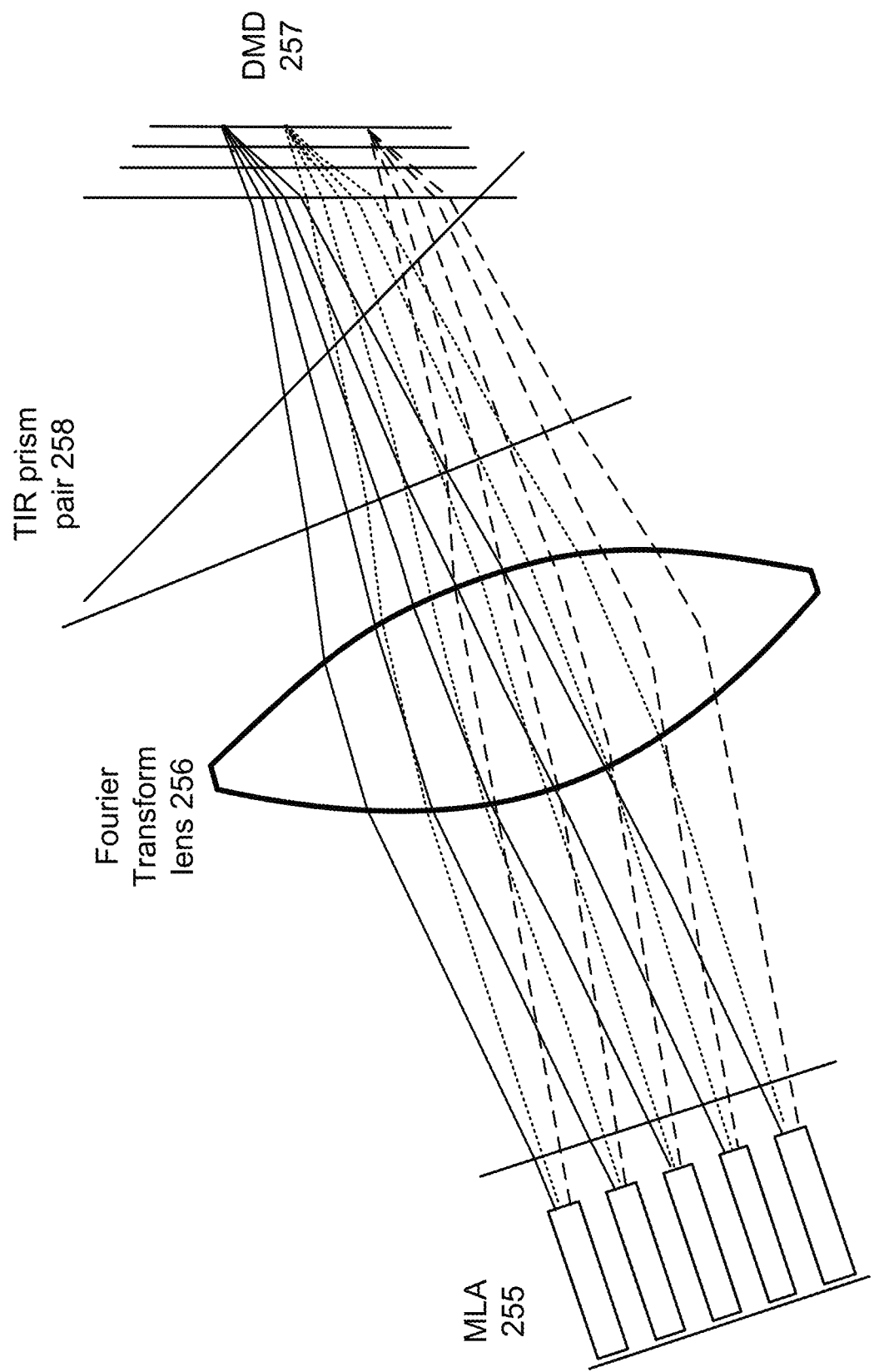
FIG. 3 is a ray trace through the MLA and Fourier Transforming lens of FIG. 2.

FIG. 3 is a ray trace through the MLA 255 and Fourier Transforming lens 256, to the DMD 257, indicating how light from all portions of the input collimated Gaussian beam (from the LEDs and entering the MLA 255 on the left) become shared across the plane of light that irradiates the DMD 257. The Fourier Transforming lens 256 converts angles of light rays exiting the MLA 255 into light ray positions at the DMD 257 and converts light ray positions exiting the MLA 255 into light ray angles irradiating the DMD 257. In this manner, each location on the DMD 257 receives light rays from many different portions of the Gaussian beam profile irradiating the MLA 255. This substantially homogenizes the beam irradiance onto the DMD 257.

Figures 4A, 4B:
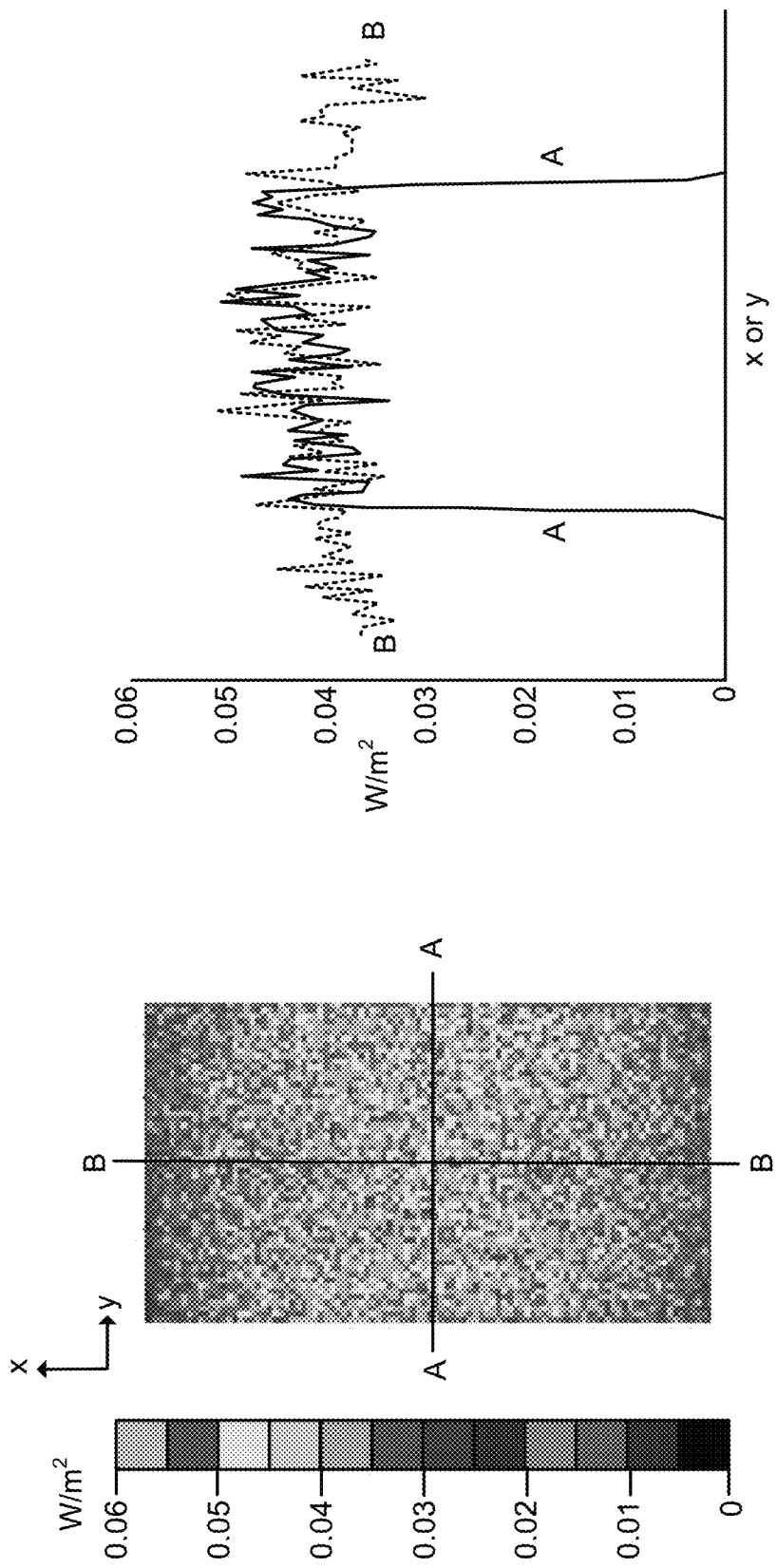
FIGS. 4A and 4B show the irradiance profile striking the DMD after beam homogenization.

FIGS. 4A and 4B show the irradiance profile striking the DMD 257 after beam homogenization. FIG. 4A is a two-dimensional plot across the surface of the DMD 257, where the color indicates the irradiance. FIG. 4B shows one-dimensional traces A-A and B-B through the two-dimensional profile of FIG. 4A. Except for some anomalous irradiance at extreme corners, the RI at the DMD is substantially homogenized. In addition, this approach (MLA plus Fourier Transforming lens) is inexpensive and compact.

Tables 1 and 2 show the optical prescription data for the system's light source collimation optics and beam homogenizer.

TABLE 1

Optical prescription for LED collimator

| Surf | Type | Radius | Thickness | Glass | Clear Diam | Conic | Comments |
|---|---|---|---|---|---|---|---|
| OBJ | STANDARD | Infinity | Infinity | | 0 | 0 | |
| STO | STANDARD | Infinity | 13.98937 | | 9 | 0 | |
| 2 | STANDARD | 10.67737 | 7.514309 | ACRYLIC | 17.35545 | −5.00311 | Condenser |
| 3 | STANDARD | −5.627265 | 1.020265 | | 17.37394 | −2.224373 | |
| 4 | STANDARD | 5.355492 | 4.527739 | POLYCARB | 9.326099 | −0.04894616 | Extractor |
| 5 | STANDARD | Infinity | 0.4 | | 6.299408 | 0 | |
| IMA | STANDARD | Infinity | | | 25.84229 | 0 | |

TABLE 2

Optical prescription for beam homogenizer

| Surf | Type | Radius | Thickness | Glass | Clear Diam | Conic | Comment |
|---|---|---|---|---|---|---|---|
| OBJ | STANDARD | Infinity | 0.036 | | 2.745501 | 0 | |
| STO | STANDARD | 2.663122 | 7.485626 | ACRYLIC | 1.854 | −0.06377113 | MLA |
| 2 | STANDARD | −2.663122 | 2.211315 | | 1.854 | −0.06377113 | |
| 3 | COORDBRK | — | 0 | | — | — | |
| 4 | STANDARD | Infinity | 15.85279 | | 2.73795 | 0 | |
| 5 | STANDARD | 19.74449 | 10.0436 | ACRYLIC | 12.28406 | −2.056522 | Relay |
| 6 | STANDARD | −19.74449 | 4.395623 | | 13.60588 | −2.056522 | |
| 7 | COORDBRK | — | 0 | | — | — | |
| 8 | TILTSURF | — | 7 | S-LAM2 | 22.45292 | — | In Prism |
| 9 | TILTSURF | — | 0.09 | | 16.50276 | — | Air |
| 10 | TILTSURF | — | 8 | S-LAM2 | 16.50006 | — | Out Prism |
| 11 | STANDARD | Infinity | 1.35 | | 15.43334 | 0 | |
| 12 | STANDARD | Infinity | 0.9 | BK7 | 14.0775 | 0 | Cover glass |
| 13 | STANDARD | Infinity | 0.9 | | 13.62693 | 0 | |
| 14 | STANDARD | Infinity | 1.26 | B270 | 12.91429 | 0 | DMD |
| IMA | STANDARD | Infinity | | | 13.1799 | 0 | |

Figure 5B:
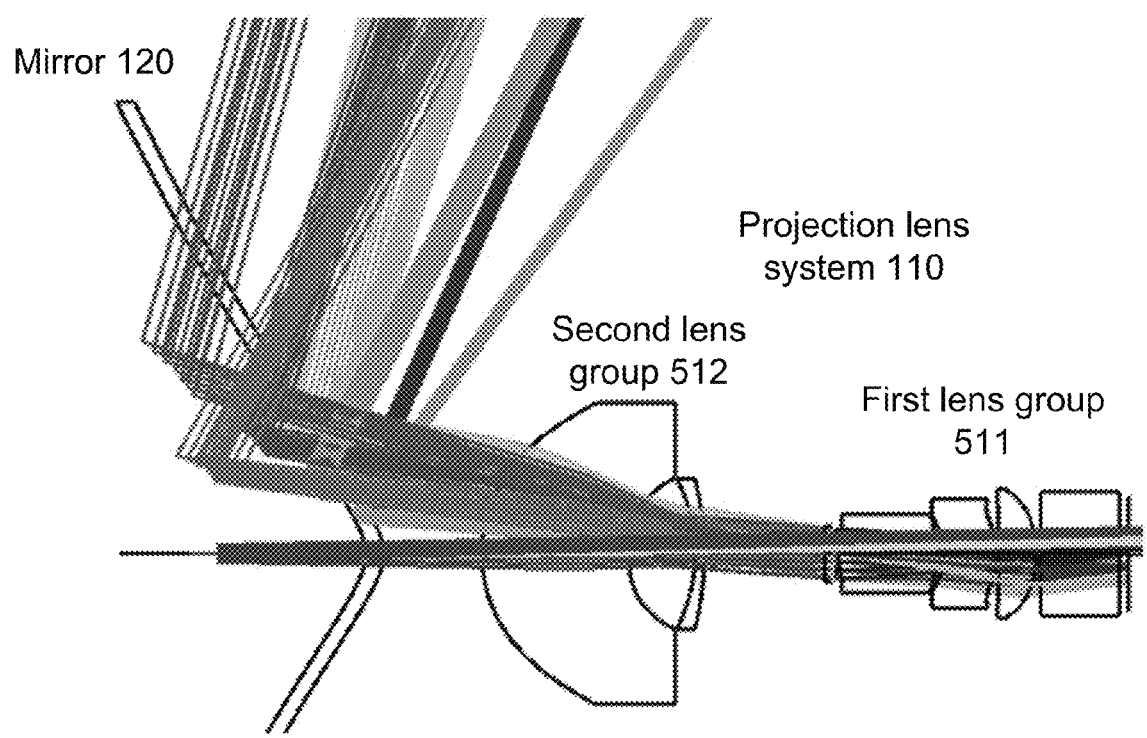

FIGS. 5A and 5B are a diagram and ray trace for the imaging path through the off-axis image projection system of FIG. 1. Table 3 shows the optical prescription data for the projection lens system 110 and free-form mirror 120.

TABLE 3

Optical prescription for projection lens system and free-form mirror

| Surf | Type | Radius | Thickness | Glass | Clear Diam | Conic | Comment |
|---|---|---|---|---|---|---|---|
| OBJ | STANDARD | Infinity | 2 | | 23.7914 | 0 | |
| 1 | STANDARD | Infinity | 16 | N-BK7 | 24.05121 | 0 | |
| 2 | STANDARD | Infinity | 1 | | 25.41835 | 0 | |
| 3 | EVENASPH | 30.7477 | 7.729093 | N-BK7 | 26.36603 | 0.592258 | |

TABLE 3-continued

Optical prescription for projection lens system and free-form mirror

| Surf | Type | Radius | Thickness | Glass | Clear Diam | Conic | Comment |
|---|---|---|---|---|---|---|---|
| 4 | EVENASPH | −110.5697 | 0.1999897 | | 25.11846 | −0.1146298 | |
| 5 | EVENASPH | 11.85581 | 10.75435 | N-BK7 | 22.22264 | −1.911712 | |
| 6 | EVENASPH | 10.70796 | 1.828717 | | 16.10539 | 0.09267831 | |
| 7 | STANDARD | 34.08811 | 19.70441 | N-BK7 | 16.05821 | 0 | |
| 8 | STANDARD | −22.02326 | 0.5 | | 10.88147 | 0 | |
| STO | STANDARD | Infinity | 0.5 | | 10 | 0 | |
| 10 | STANDARD | 60.79569 | 1.920591 | N-BK7 | 10.63152 | 0 | |
| 11 | STANDARD | −185.1722 | 24.444 | | 11.38172 | 0 | |
| 12 | STANDARD | 61.73002 | 1.882993 | N-BK7 | 29.81786 | 0 | |
| 13 | STANDARD | 33.0401 | 13.47229 | | 30.79236 | 0 | |
| 14 | EVENASPH | −39.73633 | 30 | N-BK7 | 31.04567 | 0.01438556 | |
| 15 | EVENASPH | −29.1315 | 20 | | 61.35416 | −2.005868 | |
| 16 | SZERNSAG | 8.601869 | −203.2 | MIRROR | 184.0047 | −3.124734 | mirror |
| IMA | STANDARD | Infinity | | | 3828.892 | 0 | |

Once the light reflects off the DMD, it enters the projection optical system, as diagrammed in FIG. 5. Off-axis imaging compensation begins by placing the DMD off-axis at the front-end of the imaging path. Along the imaging path, both spherical and aspherical refractive optical elements 110 are used in conjunction with a free-form mirror 120 at the output plane of the projection optics. The alignment of the DMD, the projection lens system 110 and the free-form mirror 120 all work together to pre-aberrate the output image-forming rays such that when they propagate to the projection surface, all rays are substantially mapped into their appropriate location with an appropriate brightness such that the observed image on the extreme-off-axis projection surface has high RI, high MTF, low distortion and low keystoning (i.e., high image quality). For example, embodiments may achieve RI of at least 50% at 90% of the field height, at least 3 pixel resolution across the entire field, and/or distortion of not more than 30% across the entire field.

The first lens group 511 near the DMD work to make the lens near telecentric and improve the RI of the system. The aspheres in this group correct for aberrations and some distortion. The second lens group 512 and the free form mirror 120 create the wide angle field of view (WFOV). The free form mirror 120 is correcting for the distortion associated with WFOV systems. In one application, the projection surface is the side of a car. Keystone or other distortion in the final image may originate from the shape of the car. It can be corrected with a pre-distorted image. That is, a controller coupled to the spatial light modulator predistorts the image displayed by the spatial light modulator. There is a large depth of field due to the large image space F/#. Therefore, the system may project images onto a wide range of surface contours.

Figures 6A, 6B:
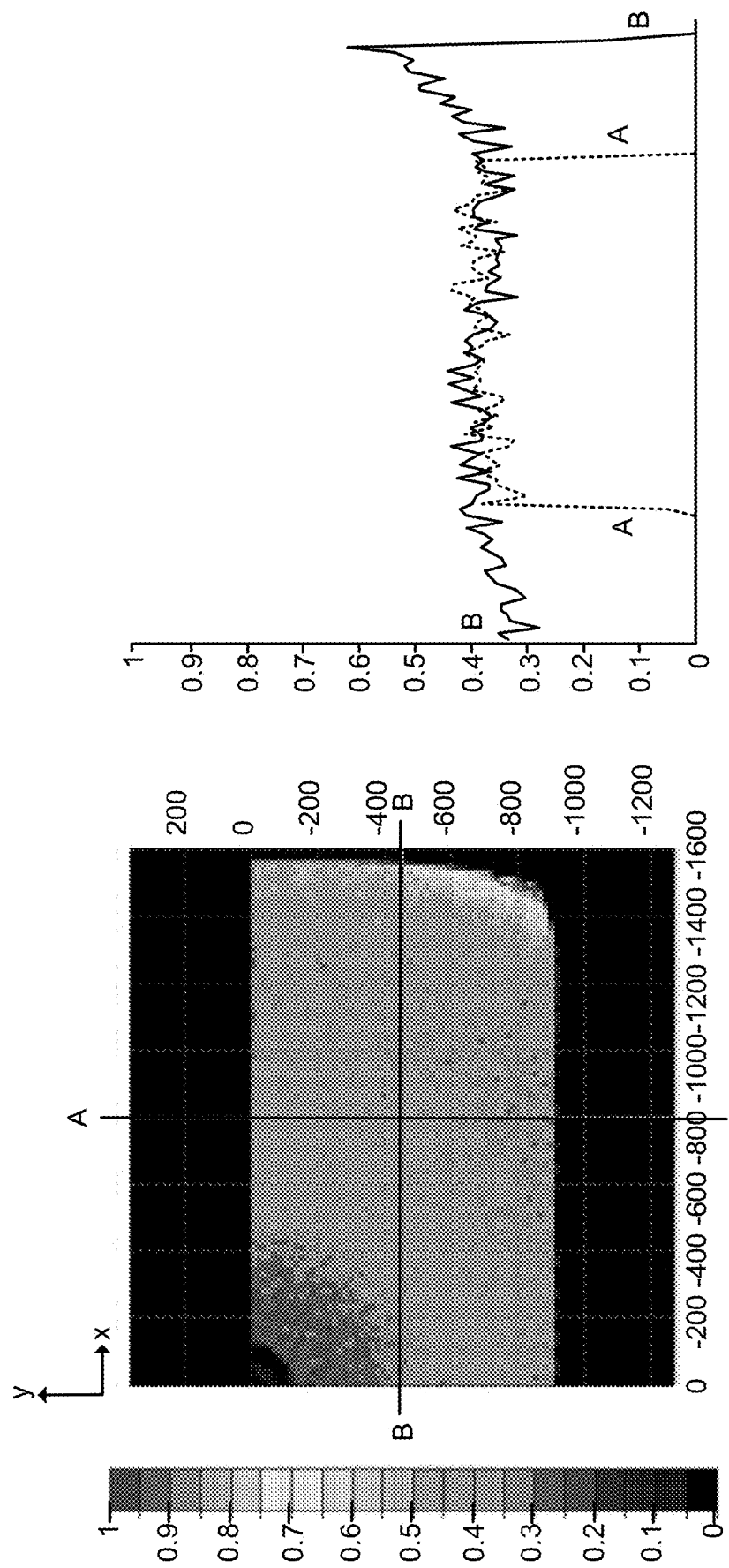
FIGS. 6A and 6B show the irradiance profile striking the final projection surface of FIG. 1.

FIGS. 6A and 6B show the irradiance profile striking the final projection surface of FIG. 1. FIG. 6A is a two-dimensional plot across the projection surface, where the color indicates the irradiance. FIG. 6B shows one-dimensional traces A-A and B-B through the two-dimensional profile of FIG. 6A. With the exception of anomalous RI at the two opposing corners of the image, the overall RI is held substantially flat using this optical design.

Figure 7:
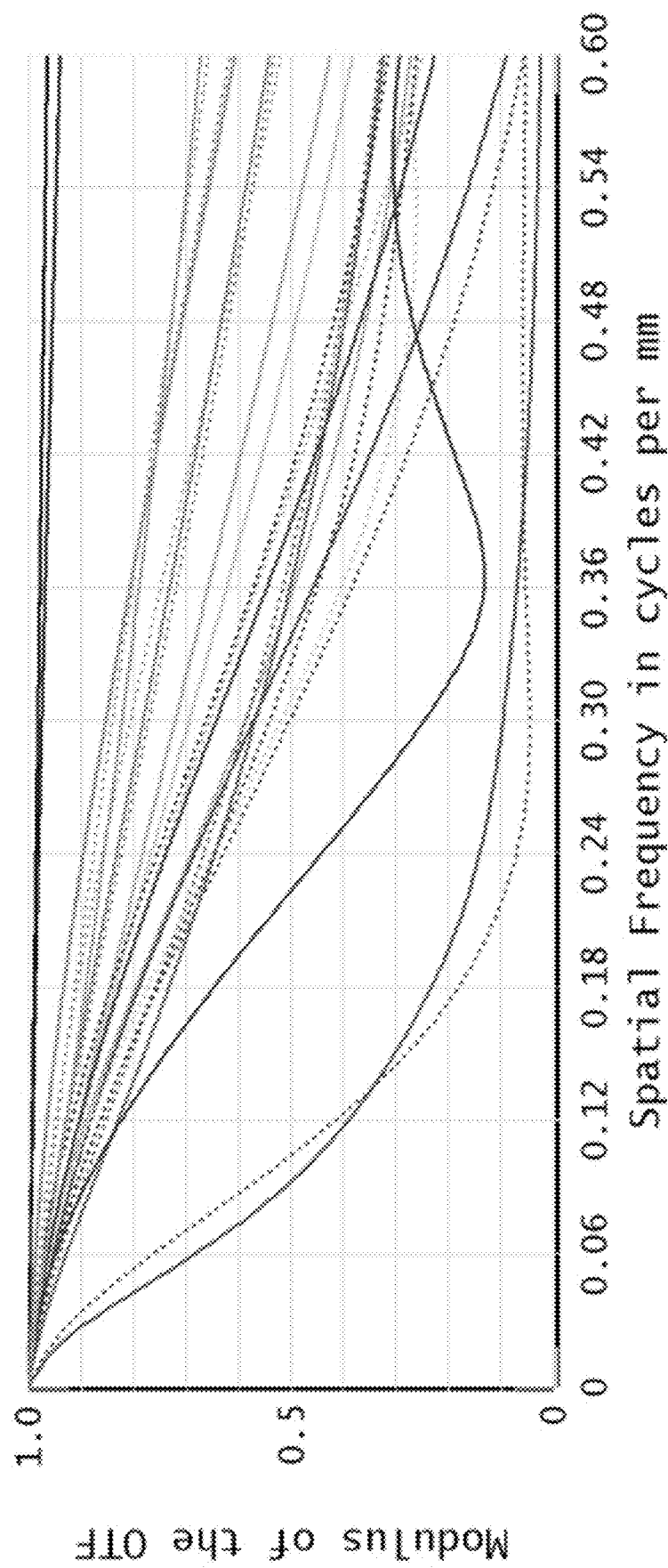
FIG. 7 plots the MTF for the system of FIG. 1.

FIG. 7 plots the MTF for this system (i.e., the final output plane MTF versus spatial frequency). The solid lines are tangential, and the dotted lines are sagittal. The Nyquist frequency of the DMD spatial light modulator (mapped on the output plane's projection surface) is 0.6 cycles per millimeter when the DMD's pixel pitch is 5.4 microns (0.833 mm pixel pitch when projected onto the output surface). The DMD has full HD resolution (1920 pixels by 1080 pixels) and the output projection plane is 1.6 meters long in the x-direction.

The projection system described above may be used in many applications. Short projection distance situations where the projection system cannot be in the projection area could use this design architecture. The system may be modified to cover a range of projection areas and display sizes. In the example design described above, the image source (DMD spatial light modulator) is offset in both x and y. In a typical short throw projector, the image source is offset along the short axis (y axis) of the source. This design is also offset along the long axis (x axis) of the source so the light can be projected both down and along the side of the vehicle.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:
1. An off-axis image projection system comprising:
a projection lens system comprising at least two lenses; and
a convex free-form mirror, the projection lens system and the free-form mirror positioned in that order along an imaging path from an image source to a projection surface and the projection lens system and the free-form mirror cooperating to project an image from the image source onto the projection surface;
wherein:
the projection lens system is characterized by an optical axis that defines a z-axis;
the projection surface extends primarily perpendicularly to the z-axis along an x- and a y-axis, the projection surface having a longer extent along the x-axis and a shorter extent along the y-axis;

the image source is offset in one direction along the x-axis, and the mirror and the projection surface are offset in an opposite direction along the x-axis;

the projection surface has an area of at least 1000 mm×600 mm; and the image source has a resolution of at least 1920×1800 pixels.

2. The off-axis image projection system of claim 1 wherein the projection lens system comprises a first lens group and a second lens group in that order along the imaging path from the image source to the projection surface, and the first lens group increases a telecentricity of the projection lens system.

3. The off-axis image projection system of claim 1 wherein the projection lens system comprises a first lens group and a second lens group in that order along the imaging path from the image source to the projection surface, and the first lens group improves a uniformity of illumination of the image projected on the projection surface.

4. The off-axis image projection system of claim 1 wherein the projection lens system comprises a first lens group and a second lens group in that order along the imaging path from the image source to the projection surface, and the first lens group comprises at least one aspheric lens that corrects optical aberration and distortion of the off-axis image projection system.

5. The off-axis image projection system of claim 1 wherein the projection lens system comprises a first lens group and a second lens group in that order along the imaging path from the image source to the projection surface, and the second lens group and free-form mirror produce a field of view for the off-axis image projection system sufficient for the projection surface, wherein the projection surface has an x-extent at least 4× longer than the z-extent of the off-axis image projection system.

6. The off-axis image projection system of claim 5 wherein the free-form mirror corrects for distortion from the field of view.

7. The off-axis image projection system of claim 1 wherein the projection lens system pre-aberrates optical rays to compensate for optical aberrations introduced by the free-form mirror.

8. The off-axis image projection system of claim 1 wherein the off-axis image projection system achieves relative illumination of at least 50% at 90% of a field height of the off-axis image projection system.

9. The off-axis image projection system of claim 1 wherein the off-axis image projection system achieves at least 3 pixel resolution across an entire field of the off-axis image projection system.

10. The off-axis image projection system of claim 1 wherein the off-axis image projection system achieves distortion of not more than 30% across an entire field of the off-axis image projection system.

11. The off-axis image projection system of claim 1 wherein the projection surface is non-planar, and the off-axis image projection system has sufficient depth of field to project the image onto the non-planar projection surface.

12. The off-axis image projection system of claim 1 further comprising:

the image source, wherein the image source comprises an array of addressable pixels; and a controller that predistorts the image produced by the image source.

13. The off-axis image projection system of claim 1 wherein the projection surface has an x-extent in a range of 800 mm to 1600 mm.

14. The off-axis image projection system of claim 1 wherein the off-axis image projection system has a z-extent of not more than 220 mm.

15. The off-axis image projection system of claim 1 wherein the image is produced by the image source on one side of a y-z plane defined by the y- and z-axes, and a footprint of the image-forming rays on the free-form mirror and the image projected on the projection surface are both on the other side of the y-z plane.

16. The off-axis image projection system of claim 1 wherein the image source is also offset in one direction along the y-axis, and the projection surface is offset in an opposite direction along the y-axis.

17. An off-axis image projection system comprising:

a projection lens system comprising at least two lenses; and a convex free-form mirror, the projection lens system and the free-form mirror positioned in that order along an imaging path from an image source to a projection surface and the projection lens system and the free-form mirror cooperating to project an image from the image source onto the projection surface;

wherein:

the projection lens system is characterized by an optical axis that defines a z-axis;

the projection surface extends primarily perpendicularly to the z-axis along an x- and a y-axis, the projection surface having a longer extent along the x-axis and a shorter extent along the y-axis;

the image source is offset in one direction along the x-axis, and the mirror and the projection surface are offset in an opposite direction along the x-axis;

the projection surface has an area of at least 1000 mm×600 mm; and the off-axis image projection system has a ratio of z-extent to x-extent in a range of 4:1 to 10:1.

18. An off-axis image projection system comprising:

a projection lens system comprising at least two lenses; and a convex free-form mirror, the projection lens system and the free-form mirror positioned in that order along an imaging path from an image source to a projection surface and the projection lens system and the free-form mirror cooperating to project an image from the image source onto the projection surface;

wherein:

the projection lens system is characterized by an optical axis that defines a z-axis;

the projection surface extends primarily perpendicularly to the z-axis along an x- and a y-axis, the projection surface having a longer extent along the x-axis and a shorter extent along the y-axis;

the image source is offset in one direction along the x-axis, and the mirror and the projection surface are offset in an opposite direction along the x-axis; and the image source comprises a light source that illuminates an addressable spatial light modulator, and the light source comprises:

an LED array that produces a Gaussian illumination; and a Fourier Transforming lens and a microlens array that convert the Gaussian illumination to a uniform illumination.

* * * * *